United States Patent [19]

Charlot et al.

[11] 4,020,292
[45] Apr. 26, 1977

[54] BAND-COMPRESSOR DEVICE

[75] Inventors: Jean-Claude Charlot; Jean-Claude Falconnier, both of Paris, France

[73] Assignee: Thomson-CSF, Paris, France

[22] Filed: Dec. 3, 1975

[21] Appl. No.: 637,469

[30] Foreign Application Priority Data

Dec. 6, 1974 France .............................. 74.40034

[52] U.S. Cl. .......................... 179/15.55 R; 307/267; 343/17.2 PC
[51] Int. Cl.² .......................................... H04B 1/66
[58] Field of Search ............... 343/17.2 PC, 5 DP; 179/15.55 R, 15.55 T; 307/267; 340/347 AD

[56] References Cited

UNITED STATES PATENTS

| | | | |
|---|---|---|---|
| 3,467,783 | 9/1969 | Magnuski | 179/15.55 R |
| 3,714,653 | 1/1973 | Thor | 343/17.2 PC |
| 3,846,786 | 11/1974 | Brown | 340/347 M |
| 3,860,760 | 1/1975 | Rittenbach | 179/15.55 T |

*Primary Examiner*—David L. Stewart
*Attorney, Agent, or Firm*—Karl F. Ross; Herbert Dubno

[57] ABSTRACT

A band-compressor devices designed to match to one another two systems having different pass bands, comprises means for coding input signals in the form of N digital signals corresponding, at any instant, to the amplitude of the input signal with respect to N quantizing levels. N bistable trigger stages of RS or JK type, followed by as many D-type bistable stages, are provided to receive said digital signals on the one hand and pulses furnished by a clock on the other. The output signals from the bistable stages of type D are then recombined in an adder in order to furnish analog signals or in a coder for furnishing signals in binary form.

6 Claims, 6 Drawing Figures

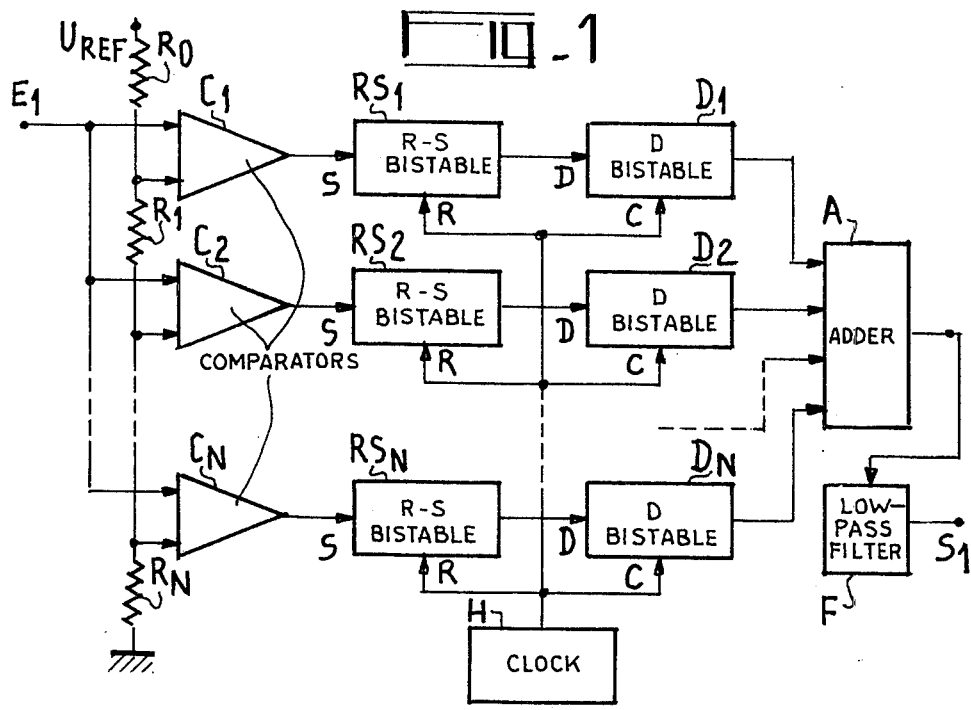
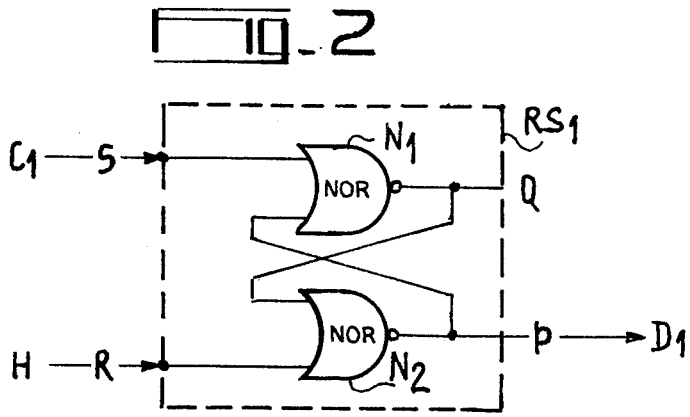
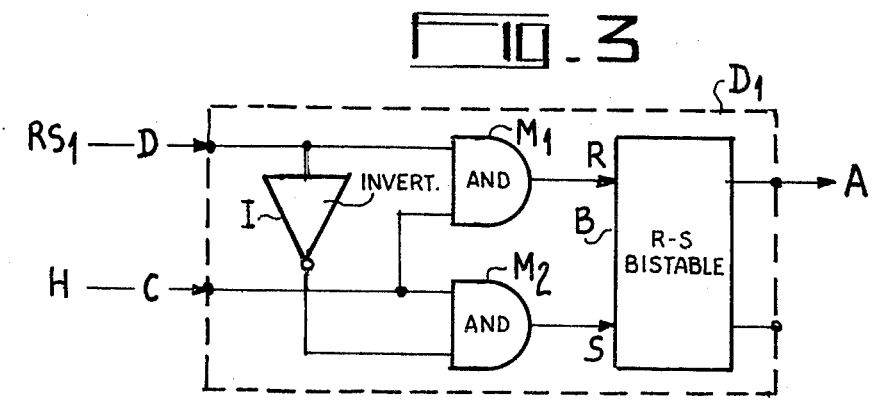

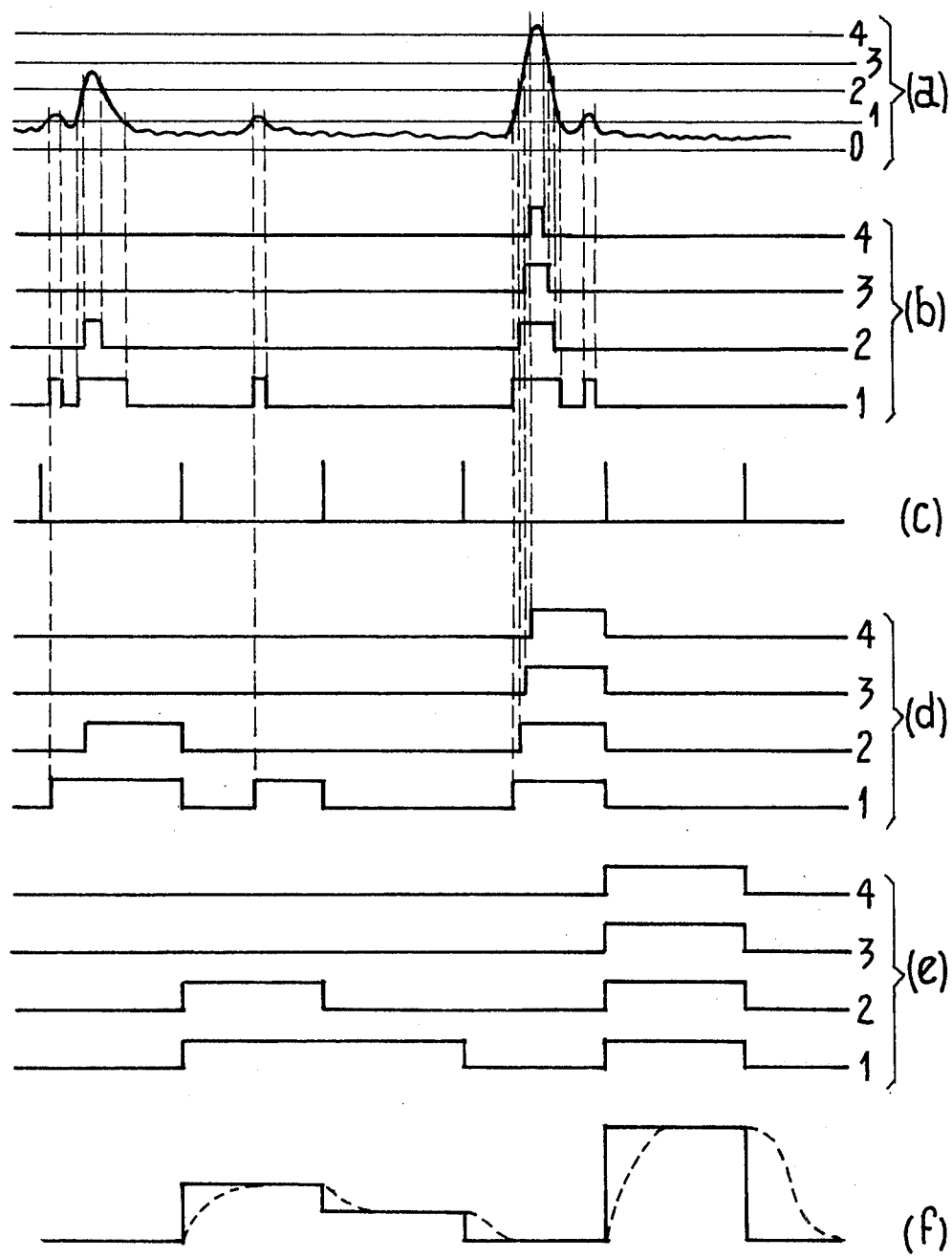

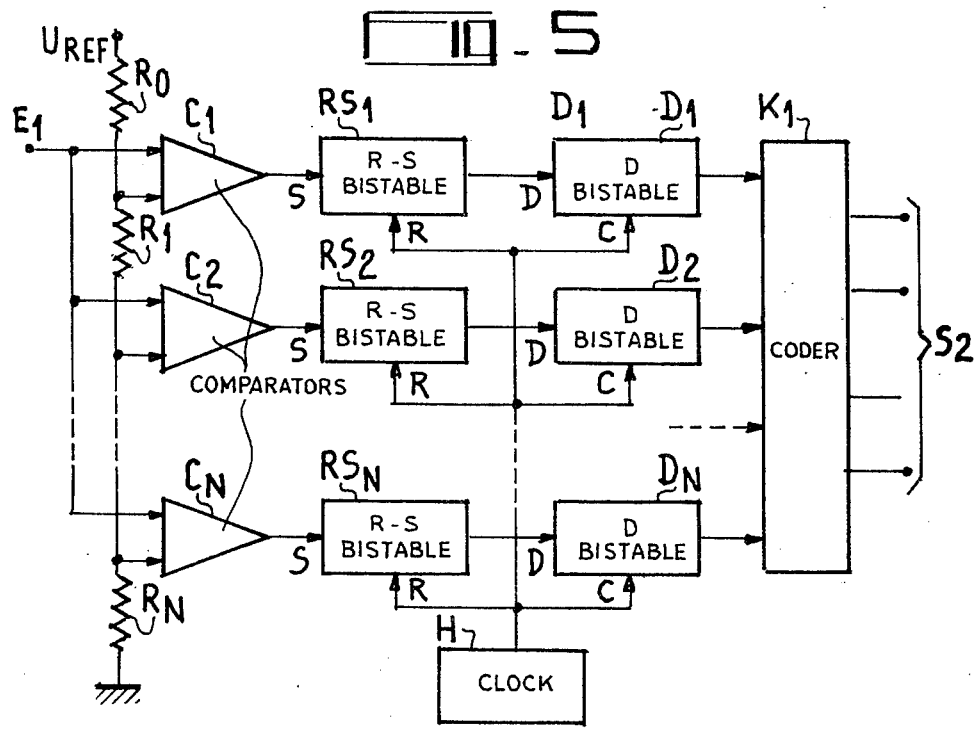
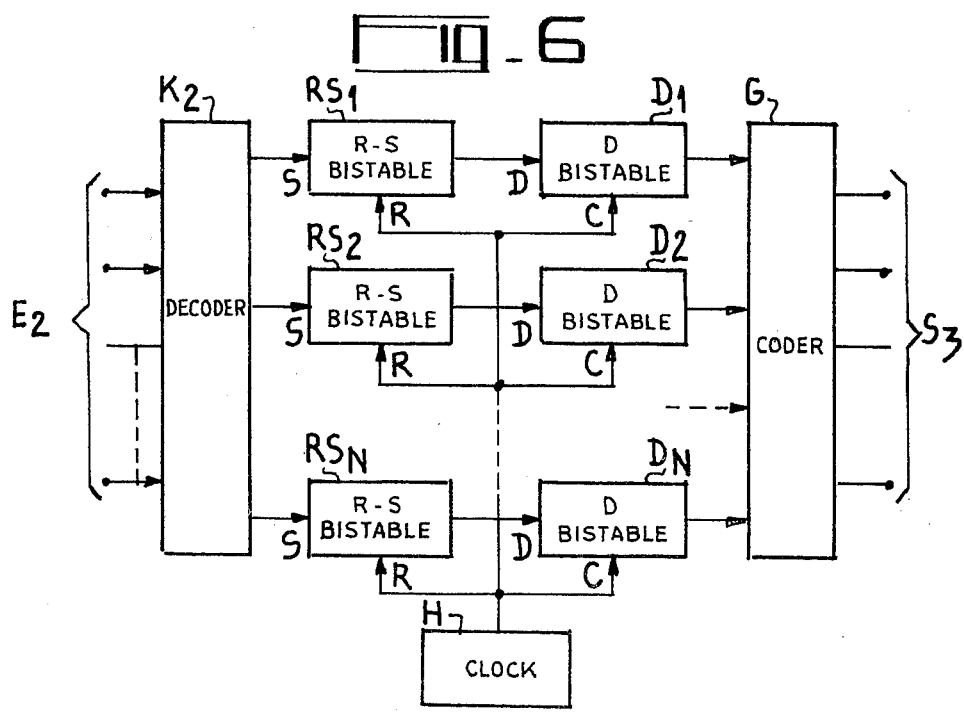

BAND-COMPRESSOR DEVICE

The present invention relates to band-compression devices and more particularly to devices of this kind which can be used in active detection systems such as radars or lidars.

It is well known that in order to differentiate a target of small effective area, as for example a periscope or snorkel belonging to a submarine, from its reflective environment of parasitic echoes, it is necessary to improve the resolution of the detection system. Resolution can in particular be improved by reducing the pulse duration. This method improves the ratio between the amplitude of the effective signal and that of the parasitic echoes from the environment. Moreover, it yields better ranging. On the other hand, however, the pass band of the video signals furnished by the receiver is wider. Generally speaking, in these applications, it is not a precision performance which is sought. Similarly, the probalility of interception of echoes from two closely spaced targets by the antenna is virtually zero. The real requirement is to achieve a contrast between the echoes from targets and the parasitic environmental echoes.

To make full use of this contrast, the processing devices which follow the receiver must have a pass band at least equal to the spectral width of the video range, i.e. to a frequency band encompassing all the harmonics of the incoming video signal. Generally speaking, this is out of the question if the processing device comprises a conventional cathode-ray display or any other kind of device designed to be exploited by a human operator. The pass band of this device is restricted and it is necessary to introduce a band-compression circuit between the receiver and the processing device in order to reduce the contrast losses which would be produced by mismatching.

One object of the invention, therefore, is the realization of a band-compression device designed to be used with short signal pulses so that the compression involves a lengthening of the pulse time.

Another object of the invention is the realization of a highly flexible essentially digital band-compression device capable of achieving a variable compression ratio.

In accordance with the invention, there is provided a band-compression device comprising an input terminal designed to receive signals occupying a frequency range of width W, coding means receiving said input signals and furnishing at N outputs digital signals corresponding, at any moment, to the value of the amplitude of the input signal in relation to N predetermined quantizing levels, each of the outputs of said coding means being connected to an input of an RS-type or JK-type bistable trigger stage one output of which is connected to the input of a D-type bistable trigger stage; a clock is connected to the other input of each trigger stage and operates at a recurrence frequency less than the frequency-range width W, decoding means with N inputs picking up the output signals from the trigger stages D and furnishing a signal whose bandwidth is compressed.

The invention will be better understood from a reading of the ensuing description, given with reference to the accompanying drawing in which:

FIG. 1 illustrates a band-compression device in accordance with the invention which receives and furnishes analog signals;

FIG. 2 is an example of an RS-type trigger stage;

FIG. 3 is an example of a D-type trigger stage;

FIG. 4 (comprised of a-b) shows the shape of the signals at various points in the circuits;

FIG. 5 illustrates another compression device supplied with analog signals and furnishing digital signals; and FIG. 6 is another compression device receiving digital signals.

FIG. 1 illustrates a band-compression device in accordance with our invention which receives and processes a signal applied at input $E_1$ in analog form. The dynamic range of the input signal, that is to say the maximum amplitude which it can reach, is divided into N quantizing levels. The amplitude of the input signal is compared, at every instant, with each of these levels. To do this, the device has N comparators $C_1, C_2 \ldots C_N$, each supplied at one input with a reference voltage defining one of the quantizing levels and at the other input with the analog input signal applied to the terminal $E_1$. The N reference voltages are produced by a divider bridge comprising N + 1 precision resistors $R_0, R_1 \ldots R_N$, connected between a d.c. voltage source $U_{REF}$ and the circuit ground. The resistors $R_0$ to $R_N$ are chosen in such a way that the quantizing levels are distributed between O and $U_{REF}$ in accordance with a given law. This law may be linear, exponential, logarithmic or other. In the example described, this law is linear. For each comparator, if the amplitude of the input signal is less than the applied reference voltage, the output signal corresponds to a logical 0 level. However, if this amplitude is higher, the output of the comparator carries a 1 level. Obviously, the levels would be reversed if a negative logic were used. The output of each comparator is connected to the input S of a bistable trigger stage of RS type whose resetting input R is connected to a clock H. The output of each bistable stage RS is connected to the data input D of a D-type bistable trigger stage also supplied, at a switching input C, with the signals from the clock H. There are as many pairs of bistable stages RS and D as there are comparators. These bistble stages, in the Figure, are marked $RS_1, RS_2 \ldots RS_N$ and $D_1, D_2 \ldots D_N$, respectively. The outputs of the D-type bistable stages are connected to the inputs of an adder circuit A followed by a low-pass filter F whose pass band is equal to the pass band of the input signal divided by the compression ratio of the device. These signals are supplied in analog form to a processing circuit, not shown, by way of an output terminal $S_1$.

The analog signals furnished by the receiver of a radar system, for example, and applied to the input $E_1$, are converted into N digital signals. The comparator $C_1$ supplied with the highest reference voltage, furnishes the digit having the greatest rank on weight. By contrast, the $N^{th}$ comparator $C_N$, which receives the lowest reference voltage, furnishes the digit having the lowest weight.

The bistable stages RS register each digit 1 applied to their setting input S and store it unitl a pulse from the clock H is applied to thier resetting input R. JK-type bistable stages can equally well be utilized in place of the RS-type bistable stages.

FIG. 2 illustrates an example of an RS-type bistable stage, here specifically the stage RS, connected between the comparator $C_1$ and the bistable stage $D_1$. It is constituted by two NOR-gates $N_1$ and $N_2$, with two inputs, each having an input connected to the output of the other. All the other bistable stages $RS_2 \ldots RS_N$ are identical therewith.

Initially, the output P carries the 0 state and the output Q is at level 1. The output Q is not used. Only the output P is connected to the succeeding D-type bistable stage. As soon as the input S receives a digit 1, the output P changes to the 1 state and remains there until a pulse from the clock H is applied to the input R.

In case a pulse at the input S happens to arrive simultaneously with the clock pulse, the bistable trigger stage may or may not change state; an indeterminate condition is then created. However, this case is the rarer the shorter the clock pulses are.

The use of a JK-type bistable stage instead of each RS-type bistable stage overcomes this drawback because a switchover takes place invariably if two pulses occur simultaneously at the inputs J and K.

FIG. 3 illustrates a D-type bistable stage, for example $D_1$. It comprises an RS-type bistable stage, B with inputs R and S, its output P being connected to the adder A and its output Q unused. The inputs R and S are connected to the outputs of two AND-gates, $M_1$ and $M_2$, with two inputs each. One of the inputs of the AND-gate $M_1$ is supplied with the signal coming from the previous RS stage, via a terminal D, while the other input receives the clock signal via a terminal C. The other AND-gate $M_2$ is likewise supplied with the clock signal from the terminal C and with the inverted input signal from the terminal D, the latter through the intermediary of an inverter I.

As long as the input C remains in the 0 state, the state of the output P does not change and retains the previously registered signal level. As soon as the input C acquires the state 1, the output P acquires the same state as the input D. In other words, with each clock pulse, each downstream stage D assumes the state already acquired by the corresponding upstream stage RS at the time of that pulse, remaining in this condition at least until the next clock pulse.

The advantage of this combination will become apparent from a consideration of FIG. 4 which illustrates the shape of the signals at various points in the circuits.

The signal (a) is an analog input signal. The amplitude of the signal is compared with four levels, for example, represented by lines marked 1, 2, 3 and 4 parallel to the level 0 which represents zero amplitude. This signal comprises two pulses corresponding to effective echoes for example. These are the two largest peaks. The smaller peaks are due to parasitic signals and noise components. In this example, we have assumed a band-compression device comprising only 4 comparators. The signals 1(b) to 4(b) represent the output signals from the comparators. The reference voltages applied to these latter are the voltages corresponding to the levels 1 to 4 of graph (a). The first comparator compares the input signal with the threshold 1 and furnishes the signal 1(b). Similarly, the other comparators compare the signal (a) with the other tresholds 2, 3 and 4 which are progressively higher and furnish the signals 2(b), 3(b) and 4(b). It will be seen that only the effective echo pulses give rise to a digit of high rank. Since the noise signal is below the level 1, it disappears from further processing.

The signal (c) is furnished by the clock H. Its recurrence period is substantially equal to the elementary duration of the input signals multiplied by the desired compression ratios.

The signals 1(b) to 4(d) represent the output signals from the 4 RS stages which follow the comparators. These bistable stages are respectively supplied with signals 1(b) to 4(b). The output signal from each RS stage changes from the 0 state to the 1 state on the rising edges of the input signal and reverts to the 0 state with each clock pulse. It is clear that the duration of the output signal from each RS stage depends upon the instant at which the signals from the comparators arrive. If this signal arrives at the beginning of the clock cycle, as is the case with the signal pulse at the left of graph 1(b), then the output signal from the bistable stage—here the one at the left of graph 1(d)— will have a duration practically equal to the recurrence period of the clock. If, by contrast, the signal arrives nearer to the end of the cycle, as is the case with the signal pulse at the right of graph 2(b), then the output signal from the bistable stage much shorter as seen at the right of graph 2(d) may be very short.

The D-type bistable stages which follow the RS-type or JK-type bistable stages are designed to standardize duration of the output signals. With each clock pulse, they acquire the state of the preceding bistable stage RS. Generally speaking, the leading edge of any output pulse of each D-type bistable stage coincides with the trailing edge of an output pulse of the preceding bistable stage; in fact, however, these leading and trailing edges overlap slightly. The output signals of the D-type bistable stages are illustrated at 1(e), 2(e), 3(e) and 4(e).

The durations of all the digits are now equal to the recurrence period of the clock signals, but these digits have a delay, produces by the D-type bistable stages, equal at most to the duration of a clock cycle. This drawback is not a very serious one, however, since the signals are all delayed and the delay can be compensated in the processing device.

When the signals 1(e) to 3(e) are added, the result is the signal (f) which has been shown in full line. After low-pass filtering, the signal is in the form shown in broken line.

The compression ratio of the device can be expressed as the ratio between the recurrence period of the clock and the duration of the input pulses. In order for the device to operate correctly, it is necessary that the response times of the comparators and RS-type bistable stages be shorter than the duration of the input signals. The RS bistable stages can be replaced by JK bistable stages, as explained before. The speed of the trigger stages D simply has to be higher than the clock speed.

The comparators at the input of the device are high-speed circuits. At the present state of the art, there are available upon the market fast comparators of E.C.L. design (Emitter-Coupled Logic). The RS or JK stages are also avialable on the market in the form of integrated circuits.

FIG. 5 illustrates another embodiment of the compression device according to our invention, receiving analog signals and producing digital signals. The diagram of FIG. 5 is identical in all respects with that of FIG. 1 to the outputs of the bistable stages $D_1, D_2 \ldots D_N$. A coder circuit $K_1$, with N inputs, is supplied with the digital signals from the D bistable stages and converts these signals into $n$-bit binary form. In this case $N = 2^n - 1$. The output signals are produced at n outputs generally designated $S_2$. This arrangement can advantageously be used in the case where the processing system is of digital type.

The band-compressor device is thus utilized as an analog-digital converter operating at a sampling frequency susbstantially lower than the bandwidth of the input signals.

Obviously, the outputs of the bistable stages $D_1 \ldots D_N$ could be applied simultaneously to a binary coder supplying a digital processing system and an adder and to a filter supplying some other analog processing system.

FIG. 6 illustrates another compressor device according to our invention supplied with digital signals. Like the devices described hereinbefore, it comprises a set of bistable stages $RS_1, RS_2 \ldots RS_N$ followed respectively by bistable stages $D_1, D_2 \ldots D_N$. The signals applied to the compressor devices are in $n$-bit binary form. These signals are applied to the n inputs (generally designated $E_2$) of a decoder circuit $K_2$ supplying at $2^n - 1$ outputs digital signals similar to the output signals from the comparators of FIG. 1. The remainder of the diagram is similar to those of FIGS. 1 and 2. The signals furnished by the bistable stages $D_1$ to $D_N$ are applied to a circuit G which may be an adder followed by a low-pass filter furnishing compressed analog signals, or a binary coder furnishing binary signals at n outputs marked $S_3$.

What is claimed is:

1. A band-compression device ocmprising an input terminal designed to receive a signal occupying a frequency range of width W, means for encoding said input signal in the form of N digital signals respectively corresponding to the value of the amplitude of the input signal with respect to N quantizing levels where N is a whole number, a clock circuit for producing pulses having a recurrence frequency less than said width W, N RS-type bistable trigger stages having first inputs respectively connected to the outputs of said encoding means and having second inputs connected to said clock, N D-type bistable trigger stages having first inputs respectively connected to the outputs of said N RS-type bistable stages and having second inputs connected to said clock, and N-input decoding means connected to the outputs of said D-type bistable stages for producing a signal whose bandwidth is compressed.

2. A band-compression device as defined in claim 1 wherein said decoding means comprise an adder circuit with N inputs and an output connected to a low-pass filter whose pass band is substantially equal to the recurrence frequency of the clock pulses.

3. A band-compression device as defined in claim 1 wherein said decoder means comprise a coder circuit with N inputs and n outputs furnishing signals in binary form.

4. A band-compression device comprising an input terminal designed to receive a signal occupying a frequency range of width W, means for encoding said input signal in the form of N digital signals respectively corresponding to the value of the amplitude of the input signal with respect to N quantizing levels where N is a whole number, a clock circuit for producing pulses having a recurrence frequency less than said width W, N JK-type bistable trigger stages having first inputs respectively connected to the outputs of said encoding means and having second inputs connected to said clock, N D-type bistable trigger stages having first inputs respectively connected to the outputs of said N JK-tupe bistable stages and having second inputs connected to said clock, and N-input decoding means connected to the outputs of said D-type bistable stage for producing a signal whose bandwidth is compressed.

5. A band-compression device as defined in claim 4 wherein said decoding means comprise an adder circuit with N inputs, and an output connected to a low-pass filter whose pass band is substantially equal to the recurrence frequency of the clock pulses.

6. A band-compression device as defined in claim 4 wherein said decoder means comprise a coder circuit with N inputs and $n$ outputs furnishing signals in binary form.

* * * * *